Patented Oct. 24, 1939

2,177,473

UNITED STATES PATENT OFFICE 2,177,473

ADSORPTION MATERIAL

Gilbert W. Brant, Buffalo, N. Y., assignor to E. I. du Pont de Nemours & Company, Wilmington, Del., a corporation of Delaware No Drawing. Application January 5, 1939, Serial No. 249,453

8 Claims. (Cl. 252—4)

This invention relates to the treatment of activated carbon, and more particularly to the preparation of an activated carbon having high efficiency in solvent recovery. It especially appertains to the purification of activated carbon of vegetable origin prior to its employment for the adsorption of hydrolyzable organic liquid and vapors.

In the past few years types of carbon have been devoloped which will adsorb organic liquids and vapors with such efficiency that they may be used commercially for the recovery of solvent vapors from atmospheres in which they occur in very low concentrations. Such recovery processes are so economical and convenient that they may even be employed for recovering the volatile organic compounds freed in many lacquering and painting processes.

In general in such processes, these carbons are contained in large gas-tight steel containers equipped or connected with suitable ducts, circulating apparatus, steam supplies, fractionating systems, etc., so that not only may the solvent vapors be removed from the atmosphere circulated through the carbon bed, but the solvents may also later be recovered from the carbon. In such procedures the recovered solvents may be condensed, purified, and otherwise prepared for reuse in further operations in the same or other processes. Ordinarily these processes are operated as a cycle of intermittent steps in which a solvent-laden atmosphere is first passed through carbon beds which adsorb the solvent vapors under one set of conditions, and when the carbon becomes more or less saturated, the passage of the solvent-laden atmosphere is discontinued and the carbon bed then treated with steam or other media under another set of conditions suitable for removing the solvent from the carbon.

It has been observed that the carbon during one or more stages of such a cycle suffers a certain loss in weight, and that there is a weakening of the structure of the granules. The "fines" resulting from such weakening tend to pack into the interstices of the carbon granules and interfere with the passage of gas therethrough. Great power losses result from the increased pressure required to force solvent-laden air through such a packed carbon bed. Over a period of a year or more, with constant reuse of the carbon, the loss in the mass of the carbon is appreciable. While no opinion is expressed, these disadvantages have been attributed to oxidation of the carbon—air, steam and possible other agencies being involved. In order to overcome these difficulties it has been necessary, and in the past customary, to frequently recondition the adsorbing unit. Screening out the "fines," replacing the carbon lost by oxidation and as "fines," and other manipulations incident to such reconditioning, add considerably to the maintenance cost of an adsorber unit or plant.

Oxidation of the carbon in adsorption carbon beds is not always of a low order and constitutes a very serious fire hazard. Such oxidation may proceed or rise to the extent and degree that the heat of oxidation is not readily conducted away, with the result that the rising temperature may lead to a conflagration within the walls of the adsorber unit.

Investigations leading up to the present invention indicate that oxidation of the carbon at the temperatures normally employed in the recovery of solvent vapors is largely due to materials, associated with the carbon, which are catalysts. Such catalytic materials, which may properly be called impurities, are normally present in most of the carbons used for gas adsorption purposes, as is evidenced by the fact that their removal greatly improves the durability of the carbon in service. Among the impurities usually present in gas adsorption activated carbon, the most active oxidation catalysts are the alkali metal carbonates and the alkali metal hydroxides. The alkaline earth metal carbonates and hydroxides are also ordinarily present, but they are of less activity.

Many types of activated carbon contain, mingled with the carbon particles (and in addition to the impurities which constitute the normal ash of the carbon), calcium carbonate in small, discrete masses. These calcium carbonate masses probably do not do much harm in this form, but when the carbon is employed in the recovery of esters (for example, ethyl acetate), the small amounts of organic acids liberated by hydrolysis react with this carbonate. There results a soluble calcium salt which in the presence of moisture is adsorbed on the carbon, and which when in contact with the carbon is moderately active catalytically in promoting oxidation of the carbon.

Washing the carbon with water (to remove the water insoluble impurities) has been tried but not found economical. Filtered ordinary hard water (the type of water usually available for plant scale washing purposes) cannot be used for the washing because it increases the concentration of harmful impurities in the carbon. In addition, carbon treated in this manner does not have a good appearance. The oxidation losses of such a washed carbon when used under acid conditions are considerable. From a practical standpoint the use of water which is of very low solids content, i. e., distilled water, is not a great deal more satisfactory. It is true that carbon washed with distilled water is much more resistant to oxidation by air and has a much higher ignition temperature than the ordinary untreated carbon, but the large quantities of distilled water necessary, and the time required for such a washing operation, make this practice a relative expensive matter. Several days or even weeks of washing are necessary to produce a satisfactory product. Even if one had to resort to this type of purification, some further treatment would be necessary to get rid of the water insoluble impurities. One might treat the carbon with dilute solutions of inorganic acids (for example, hydrochloric, sulfuric, hydrofluoric, and the like) to render the water insoluble impurities, such as the alkaline earth carbonates, water soluble (in order that they might be washed from the carbon). Apparently the only advantage of such a process would be that it decreases satisfactorily the quantity of water insoluble catalytic materials present in the carbon. A water washing must still be employed to remove the water soluble impurities ordinarily present and those which have become water soluble as the result of a later treatment. The long treatment with large quantities of distilled water is not avoided by such a preliminary treatment. Obviously, neutral or alkaline hard water cannot be used to wash out the inorganic acid. Such a wash water would deposit in the carbon the various salts, particularly those of the alkaline earth metals which it carries, and the effect of the acid-treatment purification would be nullified. Keeping the hard water, used for washing, acid with an inorganic acid (in order to prevent the adsorption by the carbon of the salts or other compounds present in the hard water) would leave some of the acid present in the carbon. A similar condition would prevail if no water washing were attempted after the aforementioned acid treatment.

It has been observed that the presence of inorganic acids in adsorption carbon promotes the hydrolysis of esters such as ethyl acetate to a degree that cannot be tolerated in commercial scale operations. It follows that an acid containing carbon such as that described cannot be used where the solvent being recovered is an ester.

This invention had for an object the removal of harmful impurities from activated carbon. Another object was to provide a method of purifying adsorption carbon in which normally available hard water might be used for washing purposes. Other objects were to provide an activated carbon with little tendency toward oxidation, and to eliminate or greatly reduce fire hazard in the recovery of solvent vapors from atmospheres containing them. A still further object was to provide an activated carbon which would show a reduced tendency to oxidation without having increased tendency to hydrolyze esters. A general advance in the art and other objects which will appear hereinafter are also contemplated.

It has now been found that the presence of organic acids in activated carbon does not promote the hydrolysis of esters to an undesirable degree. This discovery that the hydrolysis of ester solvents takes place to a much smaller extent with adsorbent carbon containing organic acids than is the case when the carbon contains inorganic acids, is an important feature of this invention. In general the objects of this invention are accomplished by treating activated gas adsorption carbon with fairly large quantities of water of the usual commercial purity to which has been added an aliphatic organic acid in small concentrations. The presence of the organic acid promotes the removal of the impurities in the carbon and prevents the adsorption of the alkali and alkaline earth metal salts and other compounds from the water. Any residual organic acid in the carbon when it is used for solvent recovery is non-detrimental. It was not anticipated that washing carbon with tap water acidified with aliphatic acids would facilitate the removal of alkaline metal impurities, since such impurities are known to be readily soluble in water of any pH value. It was surprising to find that alkali metal compounds were more readily removed by such a process than those previously known to the art.

In disclosing the preferred mode of carrying out the invention, the employment of activated carbon obtained from cocoanut shells for the adsorption of solvent vapors comprising ethyl acetate will be described. It is to be understood that these specific materials are used for purposes of illustration only, and that the invention is applicable to other adsorbent carbon and to the recovery of other compounds.

Ordinary hard tap water was poured over activated carbon obtained from cocoanut shells until the carbon was flooded (submerged). The water contained sufficient acetic acid to neutralize the alkalinity of the carbon. In this case the acetic acid was added to the water before it was poured over the carbon. Equivalent results have been obtained by adding the acetic acid to the water after the carbon had been submerged, when agitation sufficient to procure uniform distribution of the acid was possible. The carbon water mixture was allowed to stand for twelve to eighteen hours, after which the liquid was gradually drained from the carbon. The carbon was then washed with about fifty times its weight of additional wash water (ordinary tap water acidified with acetic acid to a pH of about 5.5). The rate of washing was such that about six hours was required. The carbon so treated was found to be remarkably stable in air at temperatures up to 400° C. and above. It was bright in appearance, had a very low ash content, had low hydrolytic action toward esters, and had good hardness. Its adsorption properties for organic solvents (ethyl acetate, acetone and the like) were excellent. The carbon was slightly acid in reaction due to the acetic acid. This is not an objectionable property, however, as acetic acid acidity is a normal condition for adsorbent carbon being used in the recovery of acetic acid esters.

Experience indicates that for commercial scale operations it is desirable to have the wash water with a pH value below 7, and preferably between 5 and 6. Other aliphatic organic acids such as formic, propionic, and the like, may be used satisfactorily in adjusting the pH value of the wash water. Preferably the organic acid has less than 4 carbon atoms, is liquid at ordinary temperatures, and is appreciably soluble in water. Present indications are that the removal of impurities is more rapid with wash waters of higher acidity (lower pH). It is generally desirable to allow four hours or more for the neutralization of the alkalinity of the carbon. The rate of washing in the continuous flow portion of the process is largely determined by the conditions involved. The ease of diffusion and penetration of the flowing wash water to the various parts of the carbon bed are of primary importance in such considerations.

As previously indicated, the hydrolytic action (if any) of the activated carbon of the present invention upon esters such as ethyl acetate, is greatly reduced over that encountered with previously known carbons containing inorganic acid. Carbon treated by the process described in detail above not only shows great stability toward oxidation of the atmosphere (with a consequent reduction in loss through oxidation), but also has properties and structure which reduce the fire hazard during the process of gas adsorption.

The washing treatments of this invention not only remove the impurities from the carbon, but also prevent the adsorption of solids from hard water used for washing operations.

The process of this invention is extremely convenient and economical in operation. In addition, it constitutes a highly efficient method of purifying the carbon used for solvent recovery.

As many apparently widely different embodiments of this invention may be made without departing from the spirit and scope thereof, it is to be understood that I do not limit myself to the specific embodiments thereof except as defined in the appended claims.

I claim:

1. The process which comprises submerging carbon of vegetable origin adapted for adsorption of solvents in water containing sufficient acetic acid to neutralize the alkalinity of the carbon, allowing the mixture to stand until the desired neutralization has taken place, removing the wash liquid and the materials dissolved therein, washing the carbon with about 50 times its weight of tap water acidified in the pH range 5-6 with acetic acid over a period of about 6 hours, and thereafter passing a solvent-laden atmosphere over the carbon to recover the solvent.

2. The process which comprises submerging carbon of vegetable origin adapted for adsorption of solvents in water containing sufficient aliphatic organic acid to neutralize the alkalinity of the carbon, allowing the mixture to stand until the desired neutralization has taken place, removing the wash liquid and the materials dissolved therein, washing the carbon with about 50 times its weight of tap water acidified in the pH range 5-6 with aliphatic organic acid over a period of about 6 hours, and thereafter passing a solvent-laden atmosphere over the carbon to recover the solvent.

3. The process which comprises neutralizing the alkalinity of carbon of vegetable origin adapted for the adsorption of solvents with water containing aliphatic organic acid containing less than 4 carbon atoms, washing the neutralized carbon with water containing aliphatic organic acid to remove impurities causing catalytic oxidation, and thereafter passing a solvent-laden atmosphere containing oxygen over the carbon to recover the solvent.

4. The process of claim 3 when the solvent-laden atmosphere contains ethyl acetate to be recovered.

5. The process of claim 3 when the aliphatic organic acid is acetic acid and the solvent-laden atmosphere contains acetic acid esters to be recovered.

6. The process of claim 3 when the aliphatic organic acid is acetic acid and the solvent-laden atmosphere contains ethyl acetate to be recovered.

7. The process of claim 3 when the aliphatic organic acid is acetic acid, the solvent-laden atmosphere contains ethyl acetate to be recovered, and the carbon is coconut-shell carbon.

8. The process which comprises submerging carbon of vegetable origin adapted for adsorption of solvents in water containing sufficient acetic acid to neutralize the alkalinity of the carbon, allowing the mixture to stand until the desired neutralization has taken place, removing the wash liquid and the materials dissolved therein, washing the carbon with about 50 times its weight of tap water acidified to a pH value below 7 with acetic acid over a period of at least 4 hours, and thereafter passing a solvent-laden atmosphere containing acetic acid esters over the carbon to recover the solvent.

GILBERT W. BRANT.